(12) United States Patent
Masuko et al.

(10) Patent No.: US 12,002,925 B2
(45) Date of Patent: Jun. 4, 2024

(54) SOLID-STATE SECONDARY BATTERY

(71) Applicant: TDK CORPORATION, Tokyo (JP)

(72) Inventors: Taisuke Masuko, Tokyo (JP); Kazumasa Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 525 days.

(21) Appl. No.: 17/431,549

(22) PCT Filed: Mar. 6, 2020

(86) PCT No.: PCT/JP2020/009833
§ 371 (c)(1),
(2) Date: Aug. 17, 2021

(87) PCT Pub. No.: WO2020/184476
PCT Pub. Date: Sep. 17, 2020

(65) Prior Publication Data
US 2022/0140386 A1    May 5, 2022

(30) Foreign Application Priority Data

Mar. 8, 2019   (JP) .................................. 2019-043162
Mar. 8, 2019   (JP) .................................. 2019-043163

(51) Int. Cl.
*H01M 10/0562*   (2010.01)
*H01M 10/04*     (2006.01)
*H01M 10/0585*   (2010.01)

(52) U.S. Cl.
CPC ... *H01M 10/0562* (2013.01); *H01M 10/0463* (2013.01); *H01M 10/0585* (2013.01)

(58) Field of Classification Search
None
See application file for complete search history.

(56) References Cited

U.S. PATENT DOCUMENTS

| 2007/0231704 | A1 | 10/2007 | Inda |
| 2007/0259271 | A1 | 11/2007 | Nanno et al. |
| 2019/0131654 | A1* | 5/2019 | Ito ..................... H01M 10/0562 |

FOREIGN PATENT DOCUMENTS

| EP | 2 093 824 A1 | 8/2009 |
| JP | 2006-261008 A | 9/2006 |

(Continued)

OTHER PUBLICATIONS

Machine Translation of JP-2014192041-A (Year: 2014).*
Jun. 2, 2020 Search Report issued in International Patent Application No. PCT/JP2020/009833.

*Primary Examiner* — Gregg Cantelmo
(74) *Attorney, Agent, or Firm* — Oliff PLC

(57) ABSTRACT

A solid-state secondary battery includes: a positive electrode layer; a negative electrode layer; a solid-state electrolyte layer; and side margin layers arranged side by side on outer circumferences of the positive electrode layer and the negative electrode layer. The solid-state secondary battery is made of a laminated body obtained by alternately laminating the positive electrode layer of which the side margin layer arranged on the outer circumference thereof and the negative electrode layer of which the side margin layer arranged on the outer circumference thereof with the solid-state electrolyte layer arranged therebetween, and when the porosity of the side margin layers is defined as $\varphi_m$ and the porosity of the solid-state electrolyte layer is defined as $\varphi_e$, the porosity ratio ($\varphi_m/\varphi_e$) satisfies the following Expression (1); $0.5 \leq (\varphi_m/\varphi_e) < 1 \ldots (1)$.

12 Claims, 2 Drawing Sheets

(56) References Cited

FOREIGN PATENT DOCUMENTS

| | | | |
|---|---|---|---|
| JP | 2007-005279 | A | 1/2007 |
| JP | 2007-294429 | A | 11/2007 |
| JP | 2014192041 | A * | 10/2014 |
| WO | 2008/059987 | A1 | 5/2008 |
| WO | 2013/175993 | A1 | 11/2013 |

* cited by examiner

SOLID-STATE SECONDARY BATTERY

TECHNICAL FIELD

The present invention relates to a solid-state secondary battery.

Priority is claimed on Japanese Patent Application Nos. 2019-043162 and 2019-043163, filed Mar. 8, 2019 and Mar. 8, 2019, the content of which is incorporated herein by reference.

BACKGROUND ART

In recent years, the development of electronics technology has been remarkable and portable electronic devices have been made smaller, lighter, thinner, and more multifunctional. Along with this, there is a strong demand for batteries which serve as power sources for electronic devices to be smaller, lighter, thinner, and more reliable. At present, in lithium ion secondary batteries which are widely utilized, electrolytes (electrolyte solutions) such as organic solvents have been conventionally utilized as a medium configured to move ions. However, in the batteries having the above constitution, there is a concern concerning the leakage of the electrolyte solution.

Also, since organic solvents and the like used in electrolyte solutions are flammable substances, further enhancing the safety of batteries is required. Thus, as one measure for enhancing the safety of batteries, utilizing solid electrolytes as electrolytes instead of electrolyte solutions has been proposed. Furthermore, development of solid-state batteries in which a solid-state electrolyte is utilized as an electrolyte and other constituent elements are configured to be in a solid state is underway.

For example, Patent Document 1 proposes a solid-state lithium secondary battery in which all constituent elements are configured to be in a solid state using a non-flammable solid-state electrolyte. A laminated body for this solid-state lithium secondary battery includes an active material layer and a solid-state electrolyte layer sintered and bonded to the active material layer, the active material layer contains a crystalline first substance capable of releasing and occluding lithium ions, and the solid-state electrolyte layer contains a crystalline second substance having lithium ion conductivity. Patent Document 1 describes that a filling rate of a solid-state electrolyte layer preferably exceeds 70%.

On the other hand, Patent Document 2 describes a lithium ion conductive solid-state electrolyte obtained by firing a molded product containing inorganic powder and having a porosity of 10 vol % or less.

As described in Patent Documents 1 and 2, it is generally desirable that dense solid electrolytes constituting solid-state batteries be provided.

CITATION LIST

Patent Literature

[Patent Document 1]
Japanese Unexamined Patent Application, First Publication No. 2007-5279
[Patent Document 2]
Japanese Unexamined Patent Application, First Publication No. 2007-294429
[Patent Document 3]
PCT International Publication No. WO 2013/175993
[Patent Document 4]
PCT International Publication No. WO 2008/059987

SUMMARY OF INVENTION

Technical Problem

However, as described in Patent Documents 1 and 2, in solid-state batteries having densified solid-state electrolyte layers, internal stress may be concentrated on the solid-state electrolyte layer and cracks may occur due to shrinkage during firing when the solid-state battery is manufactured or volume expansion and contraction of an electrode layer occurring during charging and discharging of the solid-state battery in some cases. As a result, it is found that the internal resistance may increase and the cycle characteristics may deteriorate.

In response to such a problem, Patent Document 3 describes a solid-state electrolyte layer in which a portion having a low porosity is formed in a region close to an electrode layer of the solid-state electrolyte layer and a portion having a high porosity is formed in a region away from the electrode layer. However, according to the research of the inventors of the present invention, if a portion having a high proportion of vacancies and a portion having a lower proportion of vacancies are formed in the solid-state electrolyte layer as in Patent Document 3, the internal resistance of the solid-state electrolyte layer increases and sufficient cycle characteristics cannot be obtained.

Also, although there is a problem that internal stress occurs due to the volume expansion and contraction of the electrode layer occurring during charging and discharging in the solid-state battery in which all of the constituent elements are configured to be in a solid state, little research has been conducted with regard to the details of the influence of this problem on the characteristics in high temperature and high humidity environments.

As described above, Patent Document 3 proposes a structure in which internal stress occurring due to the volume expansion and contraction of the electrode layer during charging and discharging is relieved by decreasing the porosity of the solid-state electrolyte layer close to the electrode layer and increasing the porosity of the solid-state electrolyte layer away from the electrode layer. However, little research has been conducted with regard to characteristics in high temperature and high humidity environments.

Although Patent Document 4 proposes a structure in which a porous layer is provided near an electrode layer in a solid-state electrolyte layer and internal stress occurring due to the volume expansion and contraction of the electrode layer during charging and discharging is relieved, with regard to the characteristics of the environments with high temperature and high humidity, the research has not been conducted.

If structures in which the porous layers are provided on the solid-state electrolyte layers or the porosity is made higher in parts of the solid-state electrolyte layers and which are proposed in Patent Documents 3 and 4 are provided, in the process of expansion and contraction during charging and discharging under high temperature and high humidity, there is a concern concerning the deterioration of high-temperature and high-humidity resistance cycle characteristics due to entering of moisture into a solid-state electrolyte layer located in a laminated body, more specifically, between a positive electrode layer and a negative electrode layer and configured to contribute to the exchanging of lithium ions.

An object of the present invention is to provide a solid-state secondary battery having excellent cycle characteristics and an solid-state secondary battery having excellent high-temperature and high-humidity resistance cycle characteristics.

Solution to Problem

The present invention provides the following means to achieve the above object.

First Aspect (1) A solid-state secondary battery according to a first aspect of the present invention includes: a positive electrode layer including a positive electrode current collector layer and a positive electrode active material layer; a negative electrode layer including a negative electrode current collector layer and a negative electrode active material layer; a solid-state electrolyte layer including a solid-state electrolyte; and side margin layers arranged side by side on outer circumferences of the positive electrode layer and the negative electrode layer, wherein the solid-state secondary battery is made of a laminated body obtained by alternately laminating the positive electrode layers of which the side margin layers arranged on the outer circumference thereof and the negative electrode layers of which the side margins layer arranged on the outer circumference thereof with the solid-state electrolyte layers arranged therebetween, and when the porosity of the side margin layers is defined as $\varphi_m$ and the porosity of the solid-state electrolyte layer is defined as $\varphi_e$, a porosity ratio $(\varphi_m/\varphi_e)$ satisfies the following Expression (1): $0.5 \le (\varphi_m/\varphi_e) < 1.0$ ... (1).

(2) In the solid-state secondary battery according to (1), the porosity ratio $(\varphi_m/\varphi_e)$ may satisfy the following Expression (2); $0.6 \le (\varphi_m/\varphi_e) < 1.0$ ... (2).

(3) In the solid-state secondary battery according to (1) or (2), the porosity $\varphi_e$ of the solid-state electrolyte layer may be $1.0\% \le \varphi_e \le 25.0\%$.

(4) In the solid-state secondary battery according to any one of (1) to (3), an average circular area conversion diameter d of voids included in the solid-state electrolyte layer and the side margin layers may be $0.1 \le d < 2.0$ μm; here, when the total area of n voids in an SEM image is defined as X, the average circular area conversion diameter d is calculated by the following Expression (3); $d = \{X/(n \times \pi)\}^{(1/2)} \times 2$ ... (3).

Second Aspect (5) A solid-state secondary battery according to a second aspect of the present invention includes: a positive electrode layer including a positive electrode current collector layer and a positive electrode active material layer; a negative electrode layer including a negative electrode current collector layer and a negative electrode active material layer; a solid-state electrolyte layer including a solid-state electrolyte; and side margin layers arranged side by side on outer circumferences of the positive electrode layer and the negative electrode layer, wherein the solid-state secondary battery is made of a laminated body formed by alternately laminating the positive electrode layer of which the side margin layer arranged on the outer circumference thereof and the negative electrode layer of which the side margin layer arranged on the outer circumference thereof with the solid-state electrolyte layer arranged therebetween, and when the porosity of the side margin layers is defined as $\varphi_m$ and the porosity of the solid-state electrolyte layer is defined as $\varphi_e$, a porosity ratio $(\varphi_m/\varphi_e)$ satisfies the following Expression (1); $1.0 < (\varphi_m/\varphi_e) \le 4.0$ ... (4).

(6) In the solid-state secondary battery according to (5), the porosity $\varphi_m$ of the side margin layers may be $0.1\% \le \varphi_m \le 20.0\%$.

(7) In the solid-state secondary battery according to (5) or (6), an average circular area conversion diameter d of voids included in the solid-state electrolyte layer and the side margin layers may be $0.05 \le d \le 2.00$ μm; here, when the total area of n voids in a SEM image is defined as X, the average circular area conversion diameter d is calculated by the following Expression (3); $d = \{X/(n \times \pi)\}^{(1/2)} \times 2$ ... (3).

Advantageous Effects of Invention

According to the present invention, a solid-state secondary battery having excellent cycle characteristics or a solid-state secondary battery having excellent high-temperature and high-humidity resistance cycle characteristics can be provided.

DESCRIPTION OF EMBODIMENTS

Figure 1:
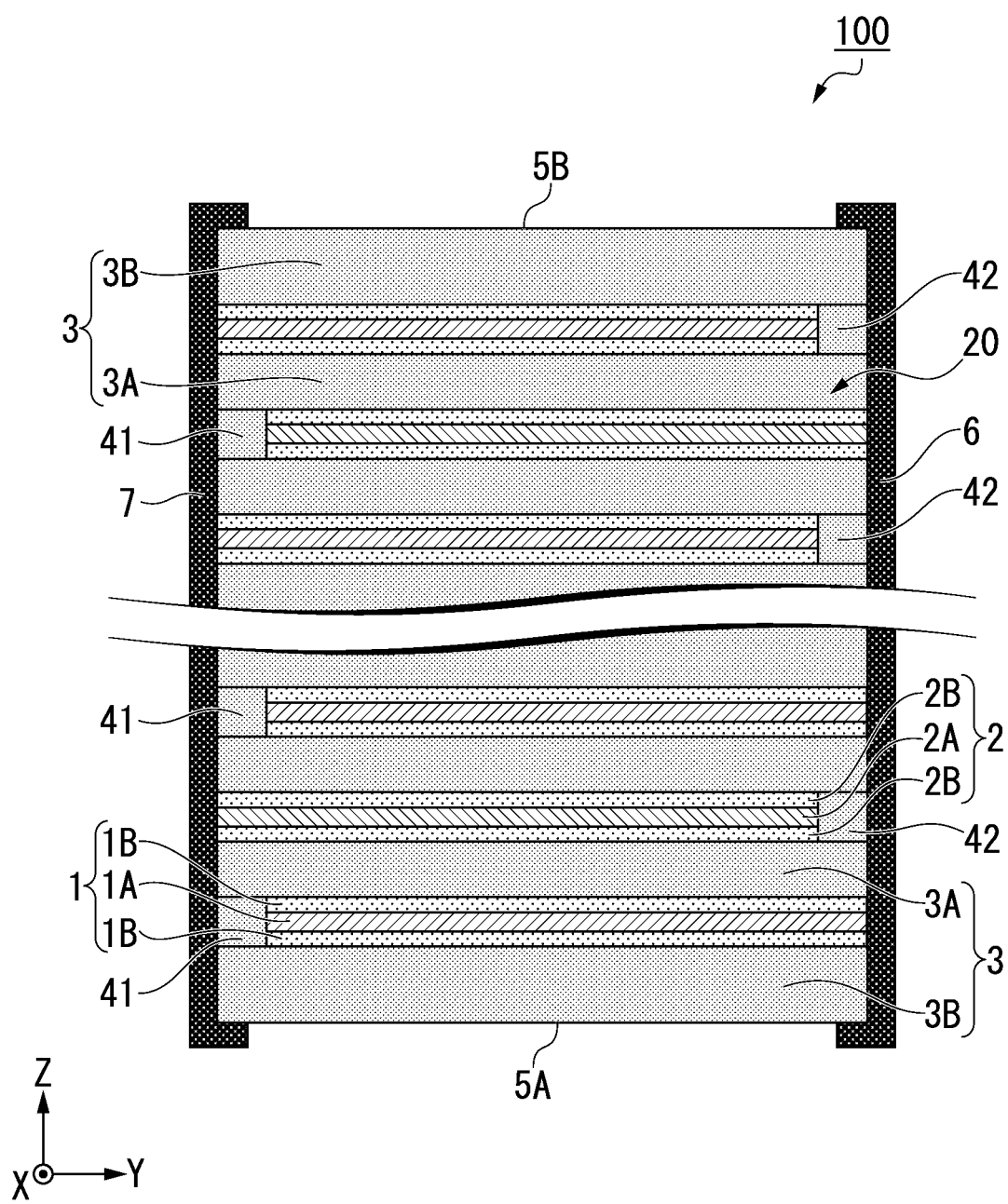
FIG. 1 is a schematic cross-sectional view of a solid-state secondary battery according to a first embodiment or a second embodiment.

A first embodiment and a second embodiment of the present invention will be described in detail below with reference to the drawings as appropriate. In the drawings used in the following description, in order to make it easier to understand the features of the first embodiment and the second embodiment, for convenience, enlarged characteristic parts may be illustrated in some cases and the dimensional ratios of the constituent elements may differ from those of the actual constituent elements in some cases.

The substances, the dimensions, and the like provided as exemplary examples in the following description are examples and this embodiment is not limited to these and can be appropriately modified and carried out within the range in which the effects of the present invention are exhibited.

Examples of the solid-state secondary battery include solid-state lithium ion secondary batteries, solid-state sodium-ion secondary batteries, solid-state magnesium-ion secondary batteries, and the like. Although a solid-state lithium ion secondary battery will be described below as an example, the first embodiment or the second embodiment is generally applicable to solid-state secondary batteries.

FIG. 1 is a schematic enlarged cross-sectional view of a main part of a solid-state lithium ion secondary battery according to a first embodiment or second embodiment.

The solid-state lithium ion secondary battery illustrated in FIG. 1 includes a laminated body having a first electrode layer, a second electrode layer, and a solid-state electrolyte layer. Hereinafter, any one of the first electrode layer and the second electrode layer functions as a positive electrode and the other thereof functions as a negative electrode. Positive and negative with respect to the electrode layers changes in accordance with which polarity is connected to an external terminal. Hereinafter, in order to facilitate the understanding, description will be provided assuming that the first electrode layer is a positive electrode layer and the second electrode layer is a negative electrode layer.

First Embodiment

A solid-state lithium ion secondary battery 100 includes positive electrode layers 1 having a positive electrode current collector layer 1A and a positive electrode active material layer 1B, negative electrode layers 2 having a negative electrode current collector layer 2A and a negative electrode active material layer 2B, solid-state electrolyte layers 3 having a solid-state electrolyte, and side margin layers 41 and 42 arranged side by side on outer circumferences of the positive electrode layers 1 and the negative electrode layers 2. In addition, a laminated body 20 obtained by alternately laminating the positive electrode layers 1 of which the side margin layers 41 arranged on the outer circumferences of the positive electrode layers 1 and the negative electrode layers 2 of which the side margin layers 42 arranged on the outer circumferences of the negative electrode layers 2, with the solid-state electrolyte layers 3 arranged between the positive electrode layers 1 and the negative electrode layers 2 is provided.

Each of the positive electrode layers 1 (first electrode layers) is connected to a first external terminal 6 and each of the negative electrode layers 2 (second electrode layers) is connected to a second external terminal 7. The first external terminal 6 and the second external terminal 7 are electrical contacts with the outside.

In FIG. 1, a direction orthogonal to the paper surface is defined as an X direction, a direction in which the first external terminal 6 faces the second external terminal 7 is defined as a Y direction, and a lamination direction is defined as a Z direction.

(Laminated Body)

The laminated body 20 includes the positive electrode layer 1, the negative electrode layer 2, the solid-state electrolyte layer 3, and the side side margin layers 41 and 42.

In the laminated body 20, the positive electrode layer 1 and the negative electrode layer 2 are alternately laminated with the solid-state electrolyte layer 3 (more specifically, an interlayer solid-state electrolyte layer 3A) arranged therebetween. The solid-state lithium ion secondary battery 100 is charged and discharged through the exchanging of lithium ions via the solid-state electrolyte layer 3 between the positive electrode layer 1 and the negative electrode layer 2.

Although the number of the positive electrode layers 1 and the negative electrode layers 2 laminated is not particularly limited, the total number of the positive electrode layers 1 and the negative electrode layers 2 is generally within a range of 10 or more and 200 or less, preferably 20 or more and 100 or less.

(Positive Electrode Layer and Negative Electrode Layer)

The positive electrode layers 1 includes a positive electrode current collector 1A and the positive electrode active material layer 1B containing a positive electrode active material. The negative electrode layer 2 includes a negative electrode current collector 2A and the negative electrode active material layer 2B containing a negative electrode active material.

The positive electrode current collector 1A and the negative electrode current collector 2A are composed of at least one substance having a high conductivity. Examples of the highly conductive substance include metals or alloys containing at least one metal element from silver (Ag), palladium (Pd), gold (Au), platinum (Pt), aluminum (Al), copper (Cu), and nickel (Ni) and non-metals such as carbon (C). Of these metal elements, copper and nickel are desirable in consideration of the manufacturing costs in addition to a magnitude of conductivity. Furthermore, copper does not easily react with a positive electrode active material, a negative electrode active material, and a solid-state electrolyte. For this reason, if copper is used for the positive electrode current collector 1A and the negative electrode current collector 2A, it is possible to reduce the internal resistance of the solid-state lithium ion secondary battery 100. Substances constituting the positive electrode current collector 1A and the negative electrode current collector 2A may be the same or different. Although the thicknesses of the positive electrode current collector 1A and the negative electrode current collector 2A are not limited, as an exemplary example, the size is within the range of 0.5 μm or more and 30 μm or less.

Positive electrode active material layers 1B active material are formed on one side or both sides of the positive electrode current collector 1A. For example, there may be no negative electrode layer 2 located above in the lamination direction and facing the positive electrode layer 1 located as the uppermost layer of the solid-state lithium ion secondary battery 100 in the lamination direction. For this reason, although active material the positive electrode active material layer 1B need be located only on one surface on a side below in the lamination direction in the positive electrode layer 1 located as the uppermost layer of the solid-state lithium ion secondary battery 100, there is no particular problem if positive electrode active material layers 1B are located on both surfaces. As in the positive electrode active material layer 1B, the negative electrode active material layer 2B is also formed on one surface or both surfaces of the negative electrode current collector 2A. Thicknesses of the positive electrode active material layer 1B and the negative electrode active material layer 2B are preferably within the range of 0.5 μm or more and 5.0 μm or less. When the thicknesses of the positive electrode active material layer 1B and the negative electrode active material layer 2B are set to 0.5 μm or more, it is possible to increase the electrical capacity of the solid-state lithium ion secondary battery. On the other hand, when the thicknesses are set to 5.0 μm or less, the diffusion distance of lithium ions is reduced. Thus, it is possible to further reduce the internal resistance of the solid-state lithium ion secondary battery.

The positive electrode active material layer 1B and the negative electrode active material layer 2B contain a positive electrode active material or a negative electrode active material capable of exchanging lithium ions and electrons. The positive electrode active material layer 1B and the negative electrode active material layer 2B may also contain a conductive additive or the like in addition to these. It is desirable that the positive electrode active material and the negative electrode active material can efficiently intercalate and deintercalate lithium ions.

There is no clear distinction between active materials constituting the positive electrode active material layer 1B or the negative electrode active material layer 2B. In addition, potentials of two types of compounds are compared, a compound having a more noble potential of the two types of compounds can be used as a positive electrode active material, and a compound having a lower potential can be used as a negative electrode active material. For this reason, the active material will be connectively described below.

As the active material, transition metal oxides, transition metal composite oxides, or the like can be utilized. Examples of the transition metal oxides and the transition metal composite oxides include lithium manganese composite oxides $Li_2Mn_aMa_{1-a}O_3$ (0.8≤a≤1; Ma=Co or Ni), lithium cobalt oxides ($LiCoO_2$), lithium nickelates ($LiNiO_2$), lithium manganese spinels ($LiMn_2O_4$), composite metal oxides represented by the general expression: $LiNi_xCo_yMn_zO_2$ (x+y+z=1; 0≤x≤1; 0≤y≤1; and 0≤z≤1), lithium vanadium compounds ($LiV_2O_5$), olivin type compounds $LiM_bPO_4$ (here, $M_b$ is one or more elements selected from Co, Ni, Mn, Fe, Mg, Nb, Ti, Al, and Zr), lithium vanadium phosphates ($Li_3V_2(PO_4)_3$ or $LiVOPO_4$), pyrophosphoric acid compounds $Li_{1+x}F_eP_2O_7$ (0≤x≤1), $Li_{1-x}VP_2O_7$ (0≤x≤1), $Li_2M_dP_2O_7$ ($M_d$=Mn, Co, Fe, or Ni), Li excess solid solution positive electrode represented by $Li_2MnO_3$—$LiM_cO_2$ ($M_c$=Mn, Co, or Ni), lithium titanates ($Li_4Ti_5O_{12}$), composite metal oxides represented by $Li_sNi_tCo_uAl_vO_2$ (0.9<s<1.3; 0.9<t+u+v<1.1), and the like.

The positive electrode current collector 1A and the negative electrode current collector 2A may contain a positive electrode active material and a negative electrode active material, respectively. The amount of an active material contained in each current collector is not particularly limited as long as the active material functions as a current collector. For example, it is desirable that a volume ratio of the positive electrode current collector/the positive electrode active material or the negative electrode current collector/the negative electrode active material be within the range of 90/10 to 70/30.

When the positive electrode current collector 1A and the negative electrode current collector 2A each contain a positive electrode active material and a negative electrode active material, the adhesion between the positive electrode current collector 1A and the positive electrode active material layer 1B and between the negative electrode current collector 2A, and the negative electrode active material layer 2B is improved.

(Solid-State Electrolyte Layer)

As illustrated in FIG. 1, the solid-state electrolyte layer 3 includes the interlayer solid-state electrolyte layer 3A located between the positive electrode active material layer 1B and the negative electrode active material layer 2B.

Also, the solid-state electrolyte layer 3 may further include the outermost solid-state electrolyte layer 3B located on the outer side of one or both (both in FIG. 1) of the positive electrode layer 1 (the positive electrode current collector 1A) and the negative electrode layer 2 (the negative electrode current collector 2A). Here, the term "outer side" means the outer side of the positive electrode layer 1 or the negative electrode layer 2 closest to a surface 5A or 5B of the laminated body 20.

The solid-state electrolyte layer 3 may not include the outermost solid-state electrolyte layer 3B. In this case, the surface 5A or 5B of the laminated body 20 is the positive electrode layer 1 or the negative electrode layer 2.

It is desirable to utilize a substance having a low electron conductivity and a high lithium ion conductivity for the solid-state electrolyte layer 3. It is desirable that the solid-state electrolyte is, for example, at least one selected from the group consisting of perovskite type compounds such as $La_{0.5}Li_{0.5}TiO_3$, lysicon type compounds such as $Li_{14}Zn(GeO_4)_4$, garnet type compounds such as $Li_7La_3Zr_2O_{12}$, nasicon type compounds such as $Li_{1.3}Al_{0.3}Ti_{1.7}(PO_4)_3$, $Li_{1.5}Al_{0.5}Ge_{1.5}(PO_4)_3$, and $LiZr_2(PO_4)_3$, thio-lysicon type compounds such as $Li_{3.25}Ge_{0.25}P_{0.75}S_4$ and $Li_3PS_4$, glass compounds such as $Li_2S$—$P_2S_5$ and $Li_2O$—$V_2O_5$—$SiO_2$, and phosphoric acid compounds such as $Li_3PO_4$, $Li_{3.5}Si_{0.5}P_{0.5}O_4$, and $Li_{2.9}PO_{3.3}N_{0.46}$.

Also, it is desirable to select the solid-state electrolyte layer 3 in accordance with the active materials used for the positive electrode layer 1 and the negative electrode layer 2. For example, it is more desirable that the solid-state electrolyte layer 3 contain the same elements as the elements constituting the active materials. When the solid-state electrolyte layer 3 contains the same elements as the elements constituting the active materials, the strong bonding is provided at the interfaces between the positive electrode active material layer 1B, the negative electrode active material layer 2B, and the solid-state electrolyte layer 3. Furthermore, it is possible to increase contact areas at the interfaces between the positive electrode active material layer 1B, the negative electrode active material layer 2B, and the solid-state electrolyte layer 3.

A thickness of the interlayer solid-state electrolyte layer 3A is preferably within the range of 0.5 μm or more and 20.0 μm or less. When a thickness of the interlayer solid-state electrolyte layer 3A is set to 0.5 μm or more, it is possible to reliably prevent a short circuit between the positive electrode layer 1 and the negative electrode layer 2. In addition, when a thickness is set to 20.0 μm or less, the moving distance of lithium ions is reduced. Thus, it is possible to further reduce the internal resistance of the solid-state lithium ion secondary battery.

Although a thickness of the outermost solid-state electrolyte layer 3B is not particularly limited, for example, if a scale is exemplified, the scale is preferably 20 μm or more and 100 μm or less. When a thickness of 20 μm or more is provided, a solid-state lithium ion secondary battery in which the positive electrode layer 1 or the negative electrode layer 2 closest to the surface 5A or 5B of the laminated body 20 is not easily oxidized due to an influence of an atmosphere in a firing process and which has a high capacity is obtained. Furthermore, if a thickness of 100 μm or less is provided, a solid-state lithium ion secondary battery in which a sufficient moisture resistance is secured, a high reliability is provided, and a high volumetric energy density is provided even in an environment of high temperature and high humidity is obtained.

(Side Margin Layer) As illustrated in FIG. 1, the laminated body 20 includes a solid-state electrolyte and includes the side margin layers 41 and 42 arranged side by side on the outer circumference of the positive electrode layers 1 and the negative electrode layers 2. The side margin layers 41 and 42 may be referred to as a "positive electrode side margin layer" and a "negative electrode side margin layer," respectively, in some cases.

Although an example in which the solid-state electrolyte included in the side margin layers 41 and 42 is the same as the solid-state electrolyte included in the solid-state electrolyte layer 3 is illustrated in FIG. 1, the solid electrolytes may differ.

It is desirable that the side margin layers 41 and 42 be provided to eliminate a step between the interlayer solid-state electrolyte layer 3A and the positive electrode layer 1 and a step between the interlayer solid-state electrolyte layer 3A and the negative electrode layer 2. Therefore, the side margin layers 41 and 42 are formed on a region on a main surface of the solid-state electrolyte layer 3 other than the positive electrode layer 1 and the negative electrode layer 2 at substantially the same height as the positive electrode layer 1 or the negative electrode layer 2 (that is, to be arranged side by side with the positive electrode layer 1 and the negative electrode layer 2). Due to the presence of the side margin layers 41 and 42, the steps between the solid-state electrolyte layer 3 and the positive electrode layer 1 and between the solid-state electrolyte layer 3 and the negative electrode layer 2 are eliminated. Thus, the compactness between the solid-state electrolyte layer 3 and each electrode layer increases and interlayer exfoliation (delamination) and warpage due to firing of the solid-state battery do not easily occur.

Figure 2:
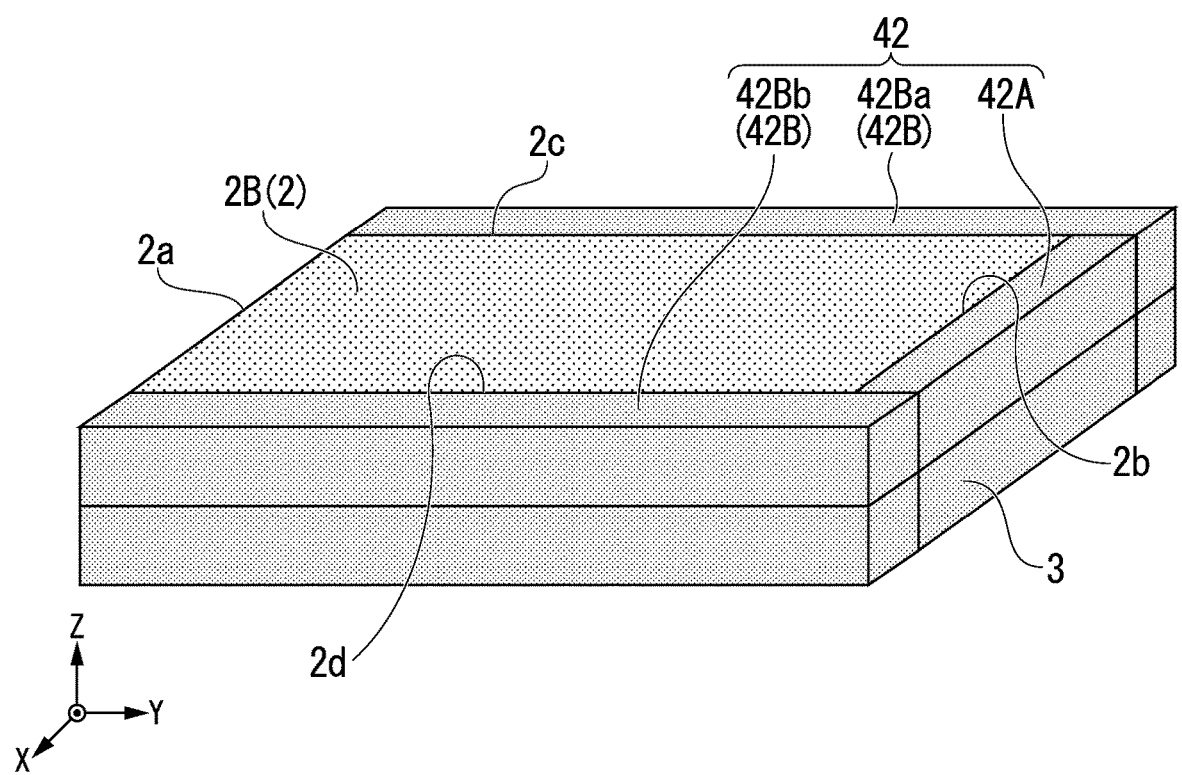
FIG. 2 is a schematic perspective view for explaining a shape of a side margin layer.

FIG. 2 illustrates a schematic perspective view of only one layer of the solid-state electrolyte layers 3, one layer of the negative electrode layers 2 which is adjacent to the one layer, and one layer of the negative electrode side margin layers 42 which are selected to explain shapes of the side margin layers.

The negative electrode side margin layer 42 illustrated in FIG. 2 is arranged in contact with an outer circumferential side surface 2b, the outer circumferential side surface 2c, and an outer circumferential side surface 2d other than an outer circumferential side surface 2a of an outer circumference (an outer circumferential side surface) of the rectangular negative electrode layer 2 when viewed in a plan view from the Z direction on the second external terminal 7 (refer to FIG. 1) side. That is to say, the side margin layer 42 has a portion 42A arranged in contact with the outer circumferential side surface 2b and a portion 42B arranged in contact with the outer circumferential side surface 2c and the outer circumferential side surface 2d. In FIG. 2, for convenience, the portion 42A and the portion 42B are separately labeled as indicated by the dotted lines. The portion 42A is only a portion arranged in contact with the outer circumferential side surface 2b and the portion 42B has a portion 42Ba obtained by combining a portion arranged in contact with the outer circumferential side surface 2c and a portion in contact with one end surface of the portion 42A and a portion 42Bb obtained by combining a portion arranged in contact with the outer circumferential side surface 2d and a portion in contact with the other end surface of the portion 42A.

Although the side margin layer 42 illustrated in FIG. 2 has a shape (a U shape) in which a part of the side margin layer is arranged on the outer circumferential side surface other than the second external terminal side, the side margin layer may be composed of only a portion (corresponding to the portion 42A in FIG. 2) in contact with the outer circumferential side surface on the opposite side of the external terminal. In this case, since the electrode layer is exposed to a side surface of the laminated body, it is desirable to cover the electrode layer with a protective layer which will be described later so that the electrode layer is not exposed.

Although the materials constituting the side margin layers 41 and 42 are not particularly limited, it is desirable that the materials contain a material having a heat shrinkage behavior similar to that of the solid-state electrolyte 3 in a firing process which will be described later. For example, if the solid-state electrolyte 3 is lithium titanium aluminum phosphate $Li_{1+x}Al_xTi_{2-x}(PO_4)_3$ ($0 \le x \le 0.6$), it is desirable that the side margin layers 41 and 42 also contain lithium titanium aluminum phosphate $Li_{1+x}Al_xTi_{2-x}(PO_4)_3$ ($0 \le x \le 0.6$). Since the solid-state electrolyte 3 and the side margin layers 41 and 42 are made of the same material, cracks due to a difference in heat shrinkage do not easily occur and an excellent interfacial bonding between the solid-state electrolyte 3 and the side margin layers 41 and 42 is provided. Furthermore, the side margin layers 41 and 42 may contain a material other than the solid-state electrolyte. In addition, examples of the materials constituting the side margin layers 41 and 42 include active material materials constituting the positive electrode active material 1B or the negative electrode active material layer 2B, glass materials effective for improving sinterability (including $Bi_2O_3$, $SiO_2$, $B_2O_3$, $ZnO$, and the like), and the like.

<Porosity>

In this specification, the term "porosity" indicates the ratio of the total area of a void portion to the total area of a prescribed layer as a percentage (%) in an image of a cross section of the laminated body parallel to the lamination direction.

The porosities illustrated in the examples were calculated through, for example, the following method. Cross sections obtained by cutting the laminate bodies in parallel with the lamination direction using a cross section polisher (CP) were observed using a scanning electron microscope (SEM). 10 points of a cross section including a side margin layer were observed using a 1000-fold observation image and porosities of the side margin layer were calculated from the each obtained SEM image using image processing software. The side margin layer in the SEM image was selected through trimming and converted into a monochrome image and binarized. In addition, the number of pixels was calculated under the assumption that the void portions were black and the other portions were white. The pixels of the selected side margin layer were calculated by adding the number of pixels in the void portions and the other portions. Furthermore, the porosity of the side margin layer was calculated by the following expression.

Porosity (%) of side margin layer=number of pixels in void portion÷(number of pixels in void portion and other portion)×100%

The average value of the porosities obtained from the 10 points of the SEM image is set as the porosity of the side margin layer.

Also with regard to the porosity of the solid-state electrolyte layer, the solid-state electrolyte layer in the SEM image is selected through trimming and the porosity of the solid-state electrolyte layer was calculated through the same method as the method for calculating the porosity of the side margin layer. The 10 points to be observed may be acquired in the same cross section or may be acquired from different cross sections of the laminated body in the same lot.

In the first embodiment, when it is assumed that the porosity of the side margin layers 41 and 42 is defined as $\varphi_m$, the porosity of the solid-state electrolyte layer 3 is defined as $\varphi_e$, a porosity ratio ($\varphi_m/\varphi_e$) satisfies the following Expression (1);

$$0.5 \le (\varphi_m/\varphi_e) < 1.0 \tag{1}$$

The reason why excellent cycle characteristics can be obtained when a relationship as shown in Expression (1) is provided is considered as follows.

The electrode layers (the positive electrode layer 1 and the negative electrode layer 2) in which volume expansion and contraction occur are arranged between the solid-state electrolyte layers 3 from an upper surface and a lower surface and the side margin layers 41 and 42 are further formed on the outer circumference. When the porosity $\varphi_m$ of the side margin layers 41 and 42 and the porosity $\varphi_e$ of the solid-state electrolyte layer 3 satisfy ($\varphi_m/\varphi_e$)<1, that is, when the porosity $\varphi_m$ of the side margin layers 41 and 42 is smaller than the porosity $\varphi_e$ of the solid-state electrolyte layer 3, the volume expansion of the electrode layer preferentially occurs on the solid-state electrolyte side existing in an upward/downward direction. Due to the volume expansion, the adhesion between the electrode layers (the positive electrode layer 1 and the negative electrode layer 2) and the solid-state electrolyte layers 3 having the electrode layer arranged therebetween is enhanced. As a result, the internal resistance decreases and better cycle characteristics can be obtained. On the other hand, when the porosity $\varphi_m$ of the side margin layers 41 and 42 is equal to the porosity $\varphi_e$ of the solid-state electrolyte layers 3 and when $\varphi_m$ is larger than $\varphi_e$, the volume expansion of the electrode layer preferentially occurs on the margin layer side of the outer circumference thereof. Therefore, the adhesion between the electrode layers (the positive electrode layer 1 and the negative electrode layer 2) and the solid-state electrolyte layer 3 does not increase. As a result, since the internal resistance does not decrease, the cycle characteristics easily decrease.

Although the volume expansion of the active material layer preferentially occurs in the solid-state electrolyte layer as compared with the side margin layer when $(\varphi_m/\varphi_e)<0.5$ is satisfied, the volume expansion occurs excessively. Thus, cracks easily occur in the solid-state battery. Therefore, it is difficult to obtain excellent cycle characteristics.

In the first embodiment, it is more desirable that the porosity ratio $(\varphi_m/\varphi_e)$ satisfies the following Expression (2);

$$0.6 \leq (\varphi_m/\varphi_e) < 1.0 \qquad (2).$$

When $0.6 \leq (\varphi_m/\varphi_e)$ is satisfied, a solid-state secondary battery which exhibits high cycle characteristics is obtained.

In the first embodiment, the porosity $\varphi_e$ of the solid-state electrolyte layer 3 is preferably $1.0\% \leq \varphi_e \leq 25.0\%$.

When the porosity $\varphi_e$ of the solid-state electrolyte layer 3 satisfies this range, better cycle characteristics can be obtained.

<Average Circular Area Conversion Diameter of Void>

In the first embodiment, the average circular area conversion diameter (a diameter) d of voids included in each of the solid-state electrolyte layers 3 and the side margin layers 41 and 42 is preferably $0.1 \leq d < 2.0$ μm.

Here, the average circular area conversion diameter d is calculated by the following Expression (2), where X is the total area of n voids in the SEM image;

$$d = \{X/(n \times \pi)\}^{(1/2)} \times 2 \qquad (3).$$

Here, it is desirable that n be a number which does not increase the variation in the average circular area conversion diameter in accordance with a method for selecting a void.

For example, as in the examples, n=20 can be set. In this case, when the number of voids in the SEM image is less than 20, the total area of all voids is defined as X.

In the first embodiment, when the average circular area conversion diameter d of the voids is $0.1 \leq d < 2.0$ μm, more excellent cycle characteristics can be obtained. If the average circular area conversion diameter d is 2.0 μm or more, cracks may easily occur in the solid-state electrolyte layer and the side margin layer due to the volume expansion and contraction due to a charging and discharging reaction and the cycle characteristics may deteriorate in some cases.

The average circular area conversion diameters in the examples are calculated by Expression (3) by converting the SEM image of the solid-state electrolyte layer and the side margin layer into a monochrome image and binarizing the SEM image through the method used in the calculation of the porosity described above and obtaining the total area X of a total of 20 (black) void portions.

(Terminal)

It is desirable to utilize a material having a high conductivity for the first external terminal 6 and the second external terminal 7 of the solid-state lithium ion secondary battery 100. For example, silver (Ag), gold (Au), platinum (Pt), aluminum (Al), copper (Cu), tin (Sn), nickel (Ni), and chromium (Cr) can be utilized. A terminal may be a single layer or a plurality of layers.

(Protective Layer)

Also, the solid-state lithium ion secondary battery 100 may have a protective layer (not shown) configured to electrically, physically, and chemically protect the laminated body 20 and the terminals on the outer circumference of the laminated body 20. As a material constituting the protective layer, it is desirable that the material has excellent insulation, durability, and moisture resistance, and is environmentally safe. For example, it is desirable to utilize glass, ceramics, thermosetting resins, or photocurable resins. The material of the protective layer may be only one type or a combination of a plurality of materials may be used. Furthermore, although the protective layer may be a single layer, it is desirable to provide a plurality of layers. Among these, organic-inorganic hybrids in which a thermosetting resin and a ceramic powder are mixed is particularly desirable.

(Method for Manufacturing Solid-State Lithium Ion Secondary Battery)

As a method for manufacturing the solid-state lithium ion secondary battery 100, a simultaneous firing method may be utilized or a sequential firing method may be utilized. The simultaneous firing method is a method in which the materials forming each layer are laminated and a laminated body is manufactured through batch firing. The sequential firing method is a method in which each layer is manufactured in order and a firing step is performed each time each layer is manufactured. When the simultaneous firing method is utilized, the number of working steps of the solid-state lithium ion secondary battery 100 can be reduced. Furthermore, when the simultaneous firing method is utilized, the dense laminated body 20 is obtained. A case in which the simultaneous firing method is utilized will be described as an example.

The simultaneous firing method includes a step of preparing a paste of each material constituting the laminated body 20, a step of preparing a green sheet by applying and drying the paste, and a step of laminating green sheets and simultaneously firing the prepared laminated sheets.

First, each material of the positive electrode current collector 1A, the positive electrode active material layer 1B, the solid-state electrolyte layer 3, the negative electrode active material layer 2B, the negative electrode current collector 2A, and the side margin layers 41 and 42 which constitute the laminated body 20 is converted into pastes.

A method of performing pasting is not particularly limited. For example, a paste is obtained by mixing a powder of each material with a vehicle. Here, the vehicle is a general term for a medium in a liquid phase. The vehicle contains a solvent and a binder. Through such a method, a paste for the positive electrode current collector 1A, a paste for the positive electrode active material layer 1B, a paste for the solid-state electrolyte layer 3, a paste for the negative electrode active material layer 2B, a paste for the negative electrode current collector 2A, and a paste for a side margin layers 41 and 42 are prepared.

A known method can be utilized as a method for changing the porosities of the solid-state electrolyte layer 3 and the side margin layers 41 and 42. For example, the porosities can be controlled by containing a void forming agent in the paste and changing the content thereof. The void forming agent can easily form voids through firing-off using debindering or firing or performing eluting using water or a solvent. Finally, a material which does not remain in the laminated body as a residual component is desirable. In addition, for example, it is desirable to utilize particles of polymethyl methacrylates (PMMA), polyphenylene sulfides (PPS), styrene butadiene rubbers (SBR), polyethylenes (PE), polystyrenes, polyamides (nylon), polyimides, polyamide-imides, polyvinylidene fluorides, polyacrylic acid, calcium alginate, carbon, proteins, and the like. As the particle size of the void forming agent, a fine particle shape is desirable and the void size can be easily changed by preferably utilizing a particle size of about 10 nm to 5 μm.

Subsequently, a green sheet is prepared. The green sheet is obtained by applying the prepared pastes on a base material such as polyethylene terephthalate (PET) in a desired order, drying it as necessary, and then peeling off the base material. A method for applying the paste is not particularly limited. For example, known methods such as screen printing, coating, transferring, and doctor blades can be adopted.

When the laminated body 20 is prepared, a laminated body can be prepared by preparing a positive electrode unit and a negative electrode unit which will be described later.

First, a solid-state electrolyte layer sheet is formed by forming the paste for the solid-state electrolyte layer 3 above a PET film to have a sheet shape using a doctor blade method and drying it. The positive electrode active material layer 1B is formed by printing the paste for the positive electrode active material layer 1B above the obtained solid-state electrolyte layer sheet through screen printing and drying it.

Subsequently, the positive electrode current collector 1A is formed by printing the paste for the positive electrode current collector 1A above the prepared positive electrode active material layer 1B through screen printing and drying it. Furthermore, the paste for the positive electrode active material layer 1B is printed above these again through screen printing and dried. In addition, the side margin layer having a height substantially equal to that of the positive electrode layer is formed by forming the paste for a side margin layer on a region of the solid-state electrolyte layer sheet other than the positive electrode layer through screen printing and drying it. Furthermore, the positive electrode unit including the positive electrode layer 1, in which the positive electrode active material layer 1B/the positive electrode current collector layer 1A/the positive electrode active material layer 1B are laminated in this order, and the side margin layer 41 formed therein on the main surface of the solid-state electrolyte layer 3 is obtained by peeling off the PET film.

In the same procedure, the negative electrode unit including the negative electrode layer 2, in which the negative electrode active material layer 2B/the negative electrode current collector layer 2A/the negative electrode active material layer 2B are laminated in this order, and the side margin layer 42 formed therein on the main surface of the solid-state electrolyte layer 3 is obtained.

Also, the laminated body of the solid-state battery is prepared by alternately offsetting the positive electrode unit and the negative electrode unit so that one ends thereof do not match and laminating these. With regard to the positive electrode unit or the negative electrode unit arranged both ends of the laminated body in the lamination direction, the outermost solid-state electrolyte layer 3B is utilized for each of the solid-state electrolyte layers 3. In addition, with regard to the positive electrode unit or the negative electrode unit arranged between these, the interlayer solid-state electrolyte layer 3A is utilized for each of the solid-state electrolyte layers 3.

Although the manufacturing method is for preparing a parallel type solid-state battery, the method for manufacturing a series type solid-state battery may be adopted as long as lamination is performed so that one end of the positive electrode layer 1 and one end of the negative electrode layer 2 match each other, that is, offsetting is not performed.

Also, it is possible to improve the adhesion by collectively pressing the prepared laminated body using a die press, a hot water isobaric press (WIP), a cold water isobaric press (CIP), a hydrostatic press, or the like. Pressurization is preferably performed while heating and can be performed, for example, at 40° C. to 95° C.

The laminated body of the solid-state battery is prepared by cutting the prepared laminated body into chips using a dicing apparatus and then undergoing debindering and firing.

A sintered body is obtained by placing the prepared laminated body 20 above a ceramic table, and for example, undergoing heating and firing at 600° C. to 1000° C. in a nitrogen atmosphere. The firing time is, for example, 0.1 to 3 hours. The firing temperature and the firing time can be changed as appropriate as long as the conditions in which the void forming agent is thermally decomposed and a current collector layer is not oxidized are provided. If a reducing atmosphere is provided, firing may be performed, for example, in an argon atmosphere or a nitrogen-hydrogen mixed atmosphere, instead of a nitrogen atmosphere.

Before the firing process, a debinder treatment can be performed as a step separate from the firing step.

When a binder component contained in the laminated body 20 is thermally decomposed before the firing, it is possible to minimize the rapid decomposition of the binder component in the firing process. The debinder treatment is performed, for example, at a temperature within the range of 300° C. to 800° C. in a nitrogen atmosphere for 0.1 to 10 hours. If a reducing atmosphere is provided, firing may be performed, for example, in an argon atmosphere or a nitrogen-hydrogen mixed atmosphere, instead of a nitrogen atmosphere.

The sintered body may be placed in a cylindrical container together with a polishing material such as alumina and subjected to barrel polishing.

Thus, it is possible to chamfer the corners of the laminated body. As another method, polishing may be performed using sandblasting. This method is desirable because only a specific part can be scraped.

(Terminal Formation)

The first external terminal 6 and the second external terminal 7 are attached to the sintered laminated body 20 (the sintered body). The first external terminal 6 and the second external terminal 7 are formed to be in electrical contact with the positive electrode current collector 1A and the negative electrode current collector 2A. For example, the first external terminal 6 and the second external terminal 7 can be formed using a known method such as a sputtering method, a dipping method, a screen printing method, and a spray coating method on the positive electrode current collector 1A and the negative electrode current collector 2A exposed from the side surface of the sintered body.

When formation is performed only in a prescribed portion, the formation is performed, for example, after performing masking using a tape or the like.

Second Embodiment

In a solid-state lithium ion secondary battery 100 in a second embodiment, a porosity ratio ($\varphi_m/\varphi_e$) when the porosity of side margin layers 41 and 42 is defined as $\varphi_m$ and the porosity of solid-state electrolyte layers 3 is defined as $\varphi_e$ is within the range different from that of the first embodiment. Furthermore, in the second embodiment, it is desirable to specifically identify the porosity $\varphi_m$ of the side margin layer instead of the porosity $\varphi_e$ of the solid-state electrolyte layer 3 specifically identified in the first embodiment. In addition, in the second embodiment, it is desirable that a range of an average circular area conversion diameter (a diameter) d of voids included in the solid-state electrolyte layers 3 and the side margin layers 41 and 42 be different from that of the first embodiment. In the second embodiment, all constituent elements other than the above differences are the same as those of the solid-state lithium ion secondary battery 100 in the first embodiment.

<Porosity>

The definition of porosity is the same as in the first embodiment.

Also, the porosity of a side margin layer and the porosity of a solid-state electrolyte layer are calculated using the same method as in the first embodiment.

In the second embodiment, when the porosity of the side margin layers 41 and 42 is defined as $\varphi_m$ and the porosity of the solid-state electrolyte layers 3 is defined as $\varphi_e$, the porosity ratio ($\varphi_m/\varphi_e$) satisfies the following Expression (4);

$$1.0 < (\varphi_m/\varphi_e) \leq 4.0 \qquad (4).$$

The reason why excellent high-temperature and high-humidity resistance cycle characteristics can be obtained when a relationship as shown in Expression (4) is provided is considered as follows.

If the porosity $\varphi_m$ of the side margin layer is designed to be larger than the porosity $\varphi_e$ of the solid-state electrolyte layer, the internal stress occurring due to the volume expansion and contraction of the electrode layer during charging and discharging is dispersed and relieved in both of the solid-state electrolyte layer (in a direction perpendicular to the electrode layer) and the side margin layer (in a direction parallel to the electrode layer). Thus, the solid-state battery in which moisture does not easily enter the laminated body, more specifically, the solid-state electrolyte layer located between the positive electrode layer and the negative electrode layer and contributing to the exchanging of lithium ions and which has excellent high-temperature and high-humidity resistance cycle characteristics is obtained.

On the other hand, if the ratio ($\varphi_m/\varphi_e$) between the porosity $\varphi_m$ of the side margin layer and the porosity $\varphi_e$ of the solid-state electrolyte layer is too high, that is, if $4.0 < \varphi_m/\varphi_e$ is satisfied, moisture easily enters the laminated body, more specifically, the solid-state electrolyte layer located between the positive electrode layer and the negative electrode layer and contributing to the exchanging of lithium ions from the side margin layer and high-temperature and high-humidity resistance cycle characteristics deteriorate.

In the second embodiment, the porosity ratio ($\varphi_m/\varphi_e$) is preferably $1.5 \leq (\varphi_m/\varphi_e) \leq 4.0$.

When the porosity ratio ($\varphi_m/\varphi_e$) is within this range, a solid-state secondary battery having more excellent high-temperature and high-humidity resistance cycle characteristics is obtained.

In the second embodiment, the porosity ratio ($\varphi_m/\varphi_e$) is more preferably $2.0 \leq (\varphi_m/\varphi_e) \leq 4.0$.

When the porosity ratio ($\varphi_m/\varphi_e$) is within this range, a solid-state secondary battery having more excellent high-temperature and high-humidity resistance cycle characteristics is obtained.

In the second embodiment, the porosity $\varphi_m$ of the side margin layers 41 and 42 is preferably $0.1\% \leq \varphi_m \leq 20.0\%$.

When the porosity $\varphi_m$ of the side margin layers 41 and 42 is within this range, a solid-state secondary battery having more excellent high-temperature and high-humidity resistance cycle characteristics is obtained.

<Average Circular Area Conversion Diameter of Void>

In the second embodiment, the average circular area conversion diameter (the diameter) d of the voids included in the solid-state electrolyte layers 3 and the side margin layers 41 and 42 is preferably $0.05 \leq d \leq 2$ µm.

Here, the average circular area conversion diameter d is calculated using the following Expression (3), where X is the total area of n voids in the SEM image;

$$d = \{X/(n \times \pi)\}^{(1/2)} \times 2 \qquad (3).$$

Here, it is desirable that n be a number which does not increase the variation in the average circular area conversion diameter in accordance with a method for selecting a void.

For example, as in the embodiment, n=20 can be set. In this case, when the number of voids in the SEM image is less than 20, the total area of all voids is set to X.

When the average circular area conversion diameter d of the voids is $0.05 \leq d \leq 2.00$ µm, a solid-state secondary battery having more excellent high-temperature and high-humidity resistance cycle characteristics is obtained. If the average circular area conversion diameter d of the voids exceeds 2 µm, cracks easily occur in the solid-state electrolyte layer and the side margin layer and high-temperature and high-humidity resistance cycle characteristics deteriorate.

The average circular area conversion diameters in the examples are calculated by Expression (3) by converting the SEM images of the solid-state electrolyte layers and the side margin layers into the monochrome images using the methods used for calculating the porosities described above, binarizing the converted monochrome images, and obtaining the total area X of a total of 20 (black) void portions.

(Terminal)

In the second embodiment, the same constitution as in the first embodiment can be used for the first external terminal 6 and the second external terminal 7 of the solid-state lithium ion secondary battery 100.

(Protective Layer)

In the second embodiment, the solid-state lithium ion secondary battery 100 may include a protective layer (not shown) configured to electrically, physically, and chemically protect the laminated body 20 and terminals on an outer circumference of the laminated body 20. It is desirable that the constitution and the material of the protective layer are the same as those in the first embodiment.

(Method for Manufacturing Solid-State Lithium Ion Secondary Battery)

As a method for manufacturing the solid-state lithium ion secondary battery 100 in the second embodiment, it is desirable to select the same method as the method for manufacturing the solid-state lithium ion secondary battery 100 in the first embodiment.

Although the first embodiment and the second embodiment of the present invention have been described in detail with reference to the drawings, each constitution and a combination thereof in each embodiment are examples and additions, omissions, replacements, and other changes of the constitution are possible without departing from the gist of the present invention.

EXAMPLES

Example 1A (Preparation of Paste for Solid-State Electrolyte Layer)

100 parts of ethanol and 200 parts of toluene were added as solvents to 100 parts of a $Li_{1.3}Al_{0.3}Ti_{1.7}(PO_4)_3$ powder using a ball mill and wet-mixed. After that, a paste for a solid-state electrolyte layer was prepared by adding and mixing 16 parts of a polyvinyl butyral-based binder as a binder, 4.8 parts of benzylbutyl phthalate as a plasticizer, and 1 part of nylon fine particles having an average particle size of 1 µm as a void forming agent.

An outermost solid-state electrolyte layer sheet and an interlayer solid-state electrolyte layer sheet were obtained by molding the paste for the solid-state electrolyte layer into a sheet using a PET film as a base material through a doctor blade method. Thicknesses of both of the outermost solid-state electrolyte layer sheet and the interlayer solid-state electrolyte layer sheet were 15 µm.

(Preparation of Paste for Side Margin)

A paste for a side margin was prepared by adding 15 parts of ethyl cellulose as a binder and 65 parts of dihydroterpineol as a solvent to 100 parts of a $Li_{1.3}Al_{0.3}Ti_{1.7}(PO_4)_3$ powder, adding 0.7 parts of nylon fine particles having an average particle size of 1 µm as a void forming agent and mixing and dispersing these.

(Preparation of Paste for a Positive Electrode Active Material Layer and Paste for a Negative Electrode Active Material Layer)

With regard to a paste for a positive electrode active material layer and a paste for a negative electrode active material layer, the paste for a positive electrode active material layer and the paste for a negative electrode active material layer were prepared by mixing $Li_3V_2(PO_4)_3$ at a prescribed weight ratio, adding 15 parts of ethyl cellulose as a binder and 65 parts of dihydroterpineol as a solvent to 100 parts of this powder, and then mixing and dispersing these.

(Preparation of Paste for Positive Electrode Current Collector and Paste for Negative Electrode Current Collector)

With regard to a paste for a positive electrode current collector and a paste for a negative electrode current collector, the paste for a positive electrode current collector layer and the paste for a negative electrode current collector layer were prepared by mixing Cu with $Li_3V_2(PO_4)_3$ as current collectors to have a volume ratio of 80:20, adding 10 parts of ethyl cellulose as a binder and 50 parts of dihydroterpineol as a solvent to 100 parts of this powder, and then mixing and dispersing these.

(Preparation of Electrode Unit)

The positive electrode unit and the negative electrode unit were manufactured as follows.

A paste for a positive electrode active material was printed through screen printing above the above-described interlayer solid-state electrolyte layer sheet to have a thickness of 5 µm. Subsequently, the printed paste for a positive electrode active material was dried at 80° C. for 5 minutes and a paste for a current collector was printed above this printed paste to have a thickness of 5 µm through screen printing. Subsequently, the printed paste for a positive electrode current collector was dried at 80° C. for 5 minutes and a paste for a positive electrode active material was further printed above this printed paste again to have a thickness of 5 µm through screen printing and dried. Furthermore, a side margin layer having a height substantially equal to that of the electrode layer was formed by forming the paste for a side margin layer on a region of the solid-state electrolyte layer sheet other than the positive electrode layer through screen printing and drying the paste for a side margin layer. Subsequently, the PET film was peeled off. In this way, a positive electrode unit in which a positive electrode layer having a positive electrode active material layer/a positive electrode current collector layer/a positive electrode active material layer laminated in this order and a positive electrode side margin layer arranged in contact with the side surface of the positive electrode layer on the outer circumference thereof were formed on a main surface of the interlayer solid-state electrolyte layer was obtained.

In this same procedure, a negative electrode unit in which a negative electrode layer having a negative electrode active material layer/a negative electrode current collector layer/a negative electrode active material layer laminated in this order and a negative electrode side margin layer 42 arranged in contact with the side surface of the positive electrode layer on the outer circumference thereof were formed on the main surface of the solid-state electrolyte layer was obtained.

(Preparation of Laminated Body)

Five solid-state electrolyte layer sheets for an outermost solid-state electrolyte layer overlapped and 50 electrode units (25 positive electrode units and 25 negative electrode unit) were alternately laminated above these solid-state electrolyte layer sheets with an interlayer solid-state electrolyte arranged therebetween. At this time, the electrode units were deviated and laminated so that current collector paste layers of odd-numbered electrode units extend only to one end surface and current collector paste layers of even-numbered electrode units extend only to the opposite end surface. Six solid-state electrolyte layer sheets for an outermost solid-state electrolyte layer were laminated above the laminated electrode units. After that, this was molded through thermocompression bonding and then cut to prepare a laminated chip. After that, a laminated body was obtained by subjecting the laminated chip to simultaneous firing.

In the simultaneous firing, a temperature was raised to a firing temperature of 840° C. at a heating rate of 200° C./hour in a nitrogen atmosphere, maintained at that temperature for 2 hours, and naturally cooled after firing.

(Preparation and Evaluation of Solid-State Secondary Battery)

A solid-state secondary battery was prepared by attaching a first external terminal and a second external terminal to a sintered laminated body (a sintered body) through a known method.

An initial discharge capacity and a capacity retention rate after 500 cycles of the solid-state secondary battery were measured by arranging the first external terminal and the second external terminal between spring probes to face each other and subjecting the first external terminal and the second external terminal to a charge/discharge test. The measurement conditions included currents during charging and discharging of 20 µA and final voltages during charging and discharging of 1.6 V and 0 V. The results are shown in Table 1. A capacity at the time of a first discharge was defined as an initial discharge capacity. Furthermore, a capacity retention rate was obtained by dividing a discharge capacity at a $500^{th}$ cycle by the initial discharge capacity.

The results are shown in Table 1.

Also, as a result of calculating an average porosity of each of the solid-state electrolyte layer and the side margin layer of the sintered laminated body (the sintered body) through the above method, the porosities were 1.0% and 0.7%.

The results are shown in Table 1.

Furthermore, when an average circular area conversion diameter was calculated in the SEM images of the cross sections of the solid-state electrolyte layer and the side margin layer of the sintered laminated body (the sintered body) through the above method, the void diameter was 0.6 µm.

The results are shown in Table 1.

TABLE 1

| | Porosity φ[%] | | | Average | |
| --- | --- | --- | --- | --- | --- |
| | Solid-state electrolyte layer ($\varphi_e$) | Side margin layer ($\varphi_m$) | Porosity ratio ($\varphi_m/\varphi_e$) | circular area conversion diameter [μm] | Cycle characteristics (%) |
| Example 1A | 1.0 | 0.7 | 0.70 | 0.6 | 90 |
| Example 2A | 1.1 | 0.9 | 0.85 | 0.6 | 89 |
| Comparative Example 1A | 1.0 | 1.1 | 1.10 | 0.6 | 77 |
| Comparative Example 2A | 1.1 | 1.3 | 1.20 | 0.6 | 76 |
| Comparative Example 3A | 1.2 | 1.6 | 1.30 | 0.6 | 76 |
| Example 3A | 5.0 | 2.5 | 0.50 | 0.6 | 84 |
| Example 4A | 5.0 | 3.0 | 0.60 | 0.6 | 92 |
| Example 5A | 4.9 | 4.3 | 0.87 | 0.6 | 91 |
| Example 6A | 5.1 | 4.8 | 0.95 | 0.6 | 88 |
| Comparative Example 4A | 5.0 | 5.0 | 1.00 | 0.6 | 79 |
| Comparative Example 5A | 5.2 | 6.2 | 1.20 | 0.6 | 77 |
| Example 7A | 8.3 | 6.2 | 0.75 | 0.6 | 91 |
| Example 8A | 8.1 | 7.3 | 0.90 | 0.6 | 89 |
| Example 9A | 8.0 | 7.9 | 0.99 | 0.6 | 87 |
| Comparative Example 6A | 7.8 | 8.2 | 1.05 | 0.6 | 78 |
| Comparative Example 7A | 7.7 | 8.8 | 1.15 | 0.6 | 77 |
| Example 10A | 10.7 | 7.5 | 0.70 | 0.6 | 92 |
| Example 11A | 10.4 | 8.3 | 0.80 | 0.6 | 90 |
| Example 12A | 10.0 | 9.7 | 0.97 | 0.6 | 88 |
| Comparative Example 8A | 9.9 | 10.4 | 1.05 | 0.6 | 77 |
| Comparative Example 9A | 10.4 | 11.4 | 1.10 | 0.6 | 76 |
| Example 13A | 11.9 | 9.5 | 0.80 | 0.6 | 89 |
| Example 14A | 11.8 | 10.6 | 0.90 | 0.6 | 88 |
| Example 15A | 11.7 | 11.2 | 0.96 | 0.6 | 87 |
| Comparative Example 10A | 10.7 | 12.3 | 1.15 | 0.6 | 76 |
| Comparative Example 11A | 11.2 | 13.4 | 1.20 | 0.6 | 75 |
| Example 16A | 20.3 | 13.2 | 0.65 | 0.6 | 85 |
| Example 17A | 20.2 | 17.2 | 0.85 | 0.6 | 83 |
| Example 18A | 20.0 | 19.0 | 0.95 | 0.6 | 82 |
| Comparative Example 12A | 20.0 | 21.0 | 1.05 | 0.6 | 75 |
| Comparative Example 13A | 20.0 | 22.0 | 1.10 | 0.6 | 74 |
| Example 19A | 30.0 | 24.0 | 0.80 | 0.6 | 81 |
| Example 20A | 30.2 | 27.2 | 0.90 | 0.6 | 80 |
| Comparative Example 14A | 30.0 | 30.0 | 1.00 | 0.6 | 71 |
| Comparative Example 15A | 29.5 | 31.3 | 1.06 | 0.6 | 65 |
| Comparative Example 16A | 29.6 | 32.6 | 1.10 | 0.6 | 64 |
| Example 21A | 0.5 | 0.4 | 0.80 | 0.6 | 84 |
| Example 22A | 0.5 | 0.45 | 0.90 | 0.6 | 83 |
| Comparative Example 17A | 0.5 | 0.5 | 1.00 | 0.6 | 78 |
| Comparative Example 18A | 0.5 | 0.6 | 1.20 | 0.6 | 77 |
| Comparative Example 19A | 0.5 | 0.7 | 1.40 | 0.6 | 76 |
| Example 23A | 5.0 | 3.0 | 0.60 | 0.1 | 93 |
| Example 4A | 5.0 | 3.0 | 0.60 | 0.6 | 92 |
| Example 24A | 5.0 | 3.0 | 0.60 | 1.0 | 90 |
| Example 25A | 5.0 | 3.0 | 0.60 | 2.0 | 88 |
| Example 26A | 5.0 | 3.0 | 0.60 | 3.0 | 84 |

Example 2A to Example 22A

In Example 2A to Example 22A, solid-state secondary batteries were prepared in the same manner as in Example 1A except that porosities were adjusted by changing the amounts of nylon fine particles which are a void forming material to be added when pastes for a solid-state electrolyte layer and pastes for a side margin were prepared.

The amounts of nylon fine particles to be added are shown in Table 2.

Comparative Example 1A to Comparative Example 19A

In Comparative Example 1A to Comparative Example 19A, solid-state secondary batteries were prepared in the same manner as in Example 1A except that porosities were adjusted by changing amounts of nylon fine particles which are a void forming material to be added when pastes for a solid-state electrolyte layer and pastes for a side margin were prepared.

The amounts of nylon fine particles to be added are shown in Table 2.

Example A23 to Example 26A

In Example 23A to Example 26A, solid-state secondary batteries were prepared in the same manner as in Example 4A except that sizes of voids were adjusted by changing particle sizes of nylon fine particles which are a void forming material.

The particle sizes of the nylon fine particles were set to Example 23A: 0.2 μm, Example 24A: 2.0 μm, Example 25A: 3.0 μm, and Example 26A: 5.0 μm.

The amounts of nylon fine particles to be added are shown in Table 2.

TABLE 2

| | Paste for solid-state electrolyte layer Nylon fine particles (parts) | Paste for side margin Nylon fine particles (parts) |
|---|---|---|
| Example 1A | 1.0 | 0.7 |
| Example 2A | 1.1 | 0.9 |
| Example 3A | 5.0 | 2.5 |
| Example 4A | 5.0 | 3.0 |
| Example 5A | 4.9 | 4.3 |
| Example 6A | 5.1 | 4.8 |
| Example 7A | 8.3 | 6.2 |
| Example 8A | 8.1 | 7.3 |
| Example 9A | 8.0 | 7.9 |
| Example 10A | 10.7 | 7.5 |
| Example 11A | 10.4 | 8.3 |
| Example 12A | 10.0 | 9.7 |
| Example 13A | 11.9 | 9.5 |
| Example 14A | 11.8 | 10.6 |
| Example 15A | 11.7 | 11.2 |
| Example 16A | 20.3 | 13.2 |
| Example 17A | 20.2 | 17.2 |
| Example 18A | 20.0 | 19.0 |
| Example 19A | 30.0 | 24.0 |
| Example 20A | 30.2 | 27.2 |
| Example 21A | 0.5 | 0.4 |
| Example 22A | 0.5 | 0.5 |
| Example 23A | 5.0 | 3.0 |
| Example 24A | 5.0 | 3.0 |
| Example 25A | 5.0 | 3.0 |
| Example 26A | 5.0 | 3.0 |
| Comparative Example 1A | 1.0 | 1.1 |
| Comparative Example 2A | 1.1 | 1.3 |
| Comparative Example 3A | 1.2 | 1.6 |
| Comparative Example 4A | 5.0 | 5.0 |
| Comparative Example 5A | 5.2 | 6.2 |
| Comparative Example 6A | 7.8 | 8.2 |
| Comparative Example 7A | 7.7 | 8.8 |
| Comparative Example 8A | 9.9 | 10.4 |
| Comparative Example 9A | 10.4 | 11.4 |
| Comparative Example 10A | 10.7 | 12.3 |
| Comparative Example 11A | 11.2 | 13.4 |
| Comparative Example 12A | 20.0 | 21.0 |
| Comparative Example 13A | 20.0 | 22.0 |
| Comparative Example 14A | 30.0 | 30.0 |
| Comparative Example 15A | 29.5 | 31.3 |
| Comparative Example 16A | 29.6 | 32.6 |
| Comparative Example 17A | 0.5 | 0.5 |
| Comparative Example 18A | 0.5 | 0.6 |
| Comparative Example 19A | 0.5 | 0.7 |

Based on Table 1, Examples 1A, 4A, 5A, 7A, 10A, 11A, 23A, and 24A have cycle characteristics of 90% or more and the range of the porosity ratios ($\varphi_m/\varphi_e$) of these examples is $0.6 \leq (\varphi_m/\varphi_e) \leq 0.87$.

Also, based on Table 1, the examples having cycle characteristics of 89% or more include Examples 2A, 8A, and 13A as well and the range of the porosity ratios ($\varphi_m/\varphi_e$) in which Examples 2A, 8A, and 13A have also been included is $0.6 \leq (\varphi_m/\varphi_e) \leq 0.90$.

Furthermore, based on Table 1, the examples having cycle characteristics of 88% or more include Example 6A, 12A, and 14A as well and the range of the porosity ratios ($\varphi_m/\varphi_e$) in which Examples 6A, 12A, 14A, and 25A have also been included is $0.6 \leq (\varphi_m/\varphi_e) \leq 0.97$.

In addition, based on Table 1, the examples having cycle characteristics of 87% or more include Examples 9A and 15A as well. The range of the porosity ratios ($\varphi_m/\varphi_e$) in which Examples 9A and 15A have also been included is $0.6 \leq (\varphi_m/\varphi_e) \leq 0.99$.

Based on Table 1, the examples having cycle characteristics of 90% or more include Examples 1A, 4A, 5A, 7A, 10A, 11A, 23A, and 24A as described above and the range of the porosities $\varphi_e$ of these solid-state electrolyte layers is $1.0 \leq (\varphi_m/\varphi_e) \leq 10.7$.

Also, the examples having cycle characteristics of 89% or more include Examples 2A, 8A, and 13A as well as described above and the range of the porosities $\varphi_e$ of the solid-state electrolyte layers in which Examples 2A, 8A, and 13A have also been included is $1.0 \leq \varphi_e \leq 11.9$.

Example 1-1B (Preparation of Paste for Solid-State Electrolyte Layer)

100 parts of ethanol and 200 parts of toluene as solvents were added to 100 parts of a $Li_{1.3}Al_{0.3}Ti_{1.7}(PO_4)_3$ powder and wet-mixed using a ball mill. After that, 16 parts of a polyvinyl butyral-based binder as a binder, 4.8 parts of benzylbutyl phthalate as a plasticizer, and 4.5 parts of nylon fine particles having an average particle size of 1 μm as a void forming agent were added and mixed to prepare a paste for a solid-state electrolyte layer.

An outermost solid-state electrolyte layer sheet and an interlayer solid-state electrolyte layer sheet were obtained by molding the paste for a solid-state electrolyte layer into a sheet using a PET film as a base material through a doctor blade method. Thicknesses of the outermost solid-state electrolyte layer sheet and the interlayer solid-state electrolyte layer sheet were both 15 μm.

(Preparation of Paste for Side Margin)

A paste for a side margin layer was prepared by adding 15 parts of ethyl cellulose as a binder, 65 parts of dihydroterpineol as a solvent, and 5.0 parts of nylon fine particles having an average particle size of 1 μm as a void forming agent to 100 parts of a $Li_{1.3}Al_{0.3}Ti_{1.7}(PO_4)_3$ powder and mixing and dispersing these.

(Preparation of Paste for Positive Electrode Active Material Layer and Paste for Negative Electrode Active Material Layer)

With regard to a paste for a positive electrode active material layer and a paste for a negative electrode active material layer, the paste for a positive electrode active material layer and the paste for a negative electrode active material layer were prepared by adding 15 parts of ethyl cellulose as a binder and 65 parts of dihydroterpineol as a solvent to 100 parts of a $Li_3V_2(PO_4)_3$ powder and mixing and dispersing these.

(Preparation of Paste for Positive Electrode Current Collector and Paste for a Negative Electrode Current Collector)

With regard to a paste for a positive electrode current collector and a paste for a negative electrode current collector, the paste for a positive electrode current collector layer and the paste for a negative electrode current collector layer were prepared by mixing Cu with $Li_3V_2(PO_4)_3$ as current collectors to have a volume ratio of 80:20, adding 10 parts of ethyl cellulose as a binder and 50 parts of dihydroterpineol as a solvent to 100 parts of this powder, and then mixing and dispersing these.

(Preparation of Electrode Unit)

A positive electrode unit and a negative electrode unit were prepared as follows.

A paste for a positive electrode active material was printed above the above-described interlayer solid-state electrolyte layer sheet to have a thickness of 5 μm through screen printing. Subsequently, the printed paste for a positive electrode active material was dried at 80° C. for 5 minutes and a paste for a current collector was printed above the printed paste for a positive electrode active material to have a thickness of 5 μm through screen printing. Subsequently, the printed paste for a positive electrode current collector was dried at 80° C. for 5 minutes and a paste for a positive electrode active material was further printed above this printed paste again to have a thickness of 5 μm through screen printing and dried. Furthermore, a side margin layer having a height substantially equal to that of the electrode layer was formed by forming the paste for a side margin layer on a region of the solid-state electrolyte layer sheet other than the positive electrode layer through screen printing and drying the paste for a side margin layer. Subsequently, the PET film was peeled off. In this way, a positive electrode unit in which a positive electrode layer having a positive electrode active material layer/a positive electrode current collector layer/a positive electrode active material layer laminated in this order and a positive electrode side margin layer arranged in contact with the side surface of the positive electrode layer on the outer circumference thereof were formed on a main surface of the interlayer solid-state electrolyte layer was obtained. In this same procedure, a negative electrode unit in which a negative electrode layer having a negative electrode active material layer/a negative electrode current collector layer/a negative electrode active material layer laminated in this order and a negative electrode side margin layer arranged in contact with the side surface of the negative electrode layer on the outer circumference thereof were formed on the main surface of the solid-state electrolyte layer was obtained.

(Preparation of Laminated Body)

Five solid-state electrolyte layer sheets for an outermost solid-state electrolyte layer overlapped and 50 electrode units (25 positive electrode units and 25 negative electrode unit) were alternately laminated above these solid-state electrolyte layer sheets with an interlayer solid-state electrolyte arranged therebetween. At this time, the electrode units were deviated and laminated so that current collector paste layers of odd-numbered electrode units extend only to one end surface and current collector paste layers of even-numbered electrode units extend only to the opposite end surface. Six solid-state electrolyte layer sheets for an outermost solid-state electrolyte layer were laminated above the laminated electrode units. After that, this was molded through thermocompression bonding and then cut to prepare a laminated chip. After that, a laminated body was obtained by subjecting the laminated chip to simultaneous firing. In the simultaneous firing, a temperature was raised to a firing temperature of 840° C. at a heating rate of 200° C./hour in a nitrogen atmosphere, maintained at that temperature for 2 hours, and naturally cooled after firing.

(Preparation and Evaluation of Solid-State Secondary Battery)

A solid-state secondary battery was prepared by attaching a first external terminal and a second external terminal to a sintered laminated body (a sintered body) through a known method.

An initial discharge capacity and a capacity retention rate after 100 cycles of the solid-state secondary battery were measured by arranging the first external terminal and the second external terminal between spring probes to face each other and subjecting the first external terminal and the second external terminal to a charge/discharge test under the conditions of temperature 40° C. and humidity 93%. The measurement conditions included currents during charging and discharging of 20 μA and final voltages during charging and discharging of 1.6 V and 0 V. As a results, the cycle characteristics was 70%. The capacity at the time of a first discharge was defined as the initial discharge capacity. Furthermore, the capacity retention rate was obtained by dividing the discharge capacity at a $100^{th}$ cycle by the initial discharge capacity.

The results are shown in Table 3.

Also, a porosity of each of the solid-state electrolyte layer and the side margin layer of the sintered laminated body (the sintered body) was calculated through the above method. The porosities were 4.5% and 5%.

The results are shown in Table 3.

Furthermore, when an average circular area conversion diameter was calculated in the SEM images of the cross sections of the solid-state electrolyte layer and the side margin layer of the sintered laminated body (the sintered body) through the above method, the average circular area conversion diameter was 0.5 μm.

The results are shown in Table 3.

TABLE 3

| | Porosity [%] | | Porosity ratio ($\varphi_m/\varphi_e$) | Average circular area conversion diameter [μm] | Cycle characteristics at high temperature and high humidity [%] |
|---|---|---|---|---|---|
| | Solid-state electrolyte layer ($\varphi_e$) | Side margin layer ($\varphi_m$) | | | |
| Example 1-1B | 4.5 | 5.0 | 1.1 | 0.6 | 70 |
| Example 1-2B | 3.8 | 5.0 | 1.3 | 0.6 | 72 |
| Example 1-3B | 3.4 | 5.0 | 1.5 | 0.6 | 75 |
| Example 1-4B | 2.5 | 5.0 | 2.0 | 0.6 | 88 |
| Example 1-5B | 1.7 | 5.0 | 3.0 | 0.6 | 84 |
| Example 1-6B | 1.3 | 5.0 | 4.0 | 0.6 | 80 |
| Comparative Example 1-1B | 25 | 5.0 | 0.2 | 0.6 | 45 |
| Comparative Example 1-2B | 0.2 | 5.0 | 25 | 0.6 | 48 |

Example 1-2B to Example 1-6B, and Comparative Example 1-1B and Comparative Example 1-2B In Example 1-2B to Example 1-6B and Comparative Example 1-1B and Comparative Example 1-2B, solid-state secondary batteries were prepared in the same manner as in Example 1-1B except that porosities were adjusted by changing amounts of nylon fine particles having an average particle size of 1 μm to be added when pastes for a solid-state electrolyte layer and pastes for a side margin layer were prepared.

The amounts of nylon fine particles to be added are shown in Table 4.

TABLE 4

| | Paste for solid-state electrolyte layer Nylon fine particles (parts) | Paste for side margin Nylon fine particles (parts) |
|---|---|---|
| Example 1-1B | 4.5 | 5.0 |
| Example 1-2B | 3.8 | 5.0 |
| Example 1-3B | 3.4 | 5.0 |
| Example 1-4B | 2.5 | 5.0 |
| Example 1-5B | 1.7 | 5.0 |
| Example 1-6B | 1.3 | 5.0 |
| Comparative Example 1-1B | 25.0 | 5.0 |
| Comparative Example 1-2B | 0.2 | 5.0 |

As shown in Table 3, the cycle characteristics at high temperature and high humidity (a temperature of 40° C. and a humidity of 93%) in Comparative Example 1-1B and Comparative Example 1-2B are less than 50%, whereas the cycle characteristics at high temperature and high humidity (a temperature of 40° C. and a humidity of 93%) in Example 1-1B to Example 1-6B in which the porosity ratios ($\varphi_m/\varphi_e$) were within the range of $1.1 \leq (\varphi_m/\varphi_e) \leq 4.0$ were 70% or more. Particularly, the cycle characteristics at high temperature and high humidity (a temperature of 40° C. and a humidity of 93%) in Example 1-3B to Example 1-6B in which the porosity ratios ($\varphi_m/\varphi_e$) were within the range of $1.5 \leq (\varphi_m/\varphi_e) \leq 4.0$ were 75% or more and the cycle characteristics at high temperature and high humidity (a temperature of 40° C. and a humidity of 93%) in Example 1-4B to Example 1-6B in which the porosity ratios ($\varphi_m/\varphi_e$) were within the range of $2.0 \leq (\varphi_m/\varphi_e) \leq 4.0$ were 80% or more.

Example 2-1B to Example 2-20B and Comparative Example 2-1B to Comparative Example 2-8B In Example 2-1B to Example 2-20B and Comparative Example 2-1B to Comparative Example 2-8B, solid-state secondary batteries were prepared in the same manner as in Example 1-1B except that porosities were adjusted by changing amounts of nylon fine particles having an average particle size of 1 μm when pastes for a solid-state electrolyte layer and pastes for a side margin layer were prepared.

The amounts of nylon fine particles to be added were shown in Table 5.

Table 6 shows the evaluation results of the solid-state secondary batteries.

TABLE 5

|  | Paste for solid-state electrolyte layer Nylon fine particles (parts) | Paste for side margin Nylon fine particles (parts) |
|---|---|---|
| Example 2-1B | 0.068 | 0.1 |
| Example 2-2B | 0.050 | 0.1 |
| Example 2-3B | 0.033 | 0.1 |
| Example 2-4B | 0.025 | 0.1 |
| Example 2-5B | 0.68 | 1.0 |
| Example 2-6B | 0.50 | 1.0 |
| Example 2-7B | 0.33 | 1.0 |
| Example 2-8B | 0.25 | 1.0 |
| Example 2-9B | 6.8 | 10 |
| Example 2-10B | 5.0 | 10 |
| Example 2-11B | 3.3 | 10 |
| Example 2-12B | 2.5 | 10 |
| Example 2-13B | 14 | 20 |
| Example 2-14B | 10 | 20 |
| Example 2-15B | 7 | 20 |
| Example 2-16B | 5 | 20 |
| Example 2-17B | 0.03 | 0.05 |
| Example 2-18B | 17 | 25 |
| Example 2-19B | 0.01 | 0.05 |
| Example 2-20B | 6.3 | 25 |
| Comparative Example 2-1B | 0.200 | 0.1 |
| Comparative Example 2-2B | 0.010 | 0.1 |
| Comparative Example 2-3B | 2.00 | 1.0 |
| Comparative Example 2-4B | 0.10 | 1.0 |
| Comparative Example 2-5B | 20 | 10 |
| Comparative Example 2-6B | 1 | 10 |
| Comparative Example 2-7B | 40 | 20 |
| Comparative Example 2-8B | 2 | 20 |

TABLE 6

|  | Porosity [%] | | Porosity ratio ($\varphi_m/\varphi_c$) | Average circular area conversion diameter [μm] | Cycle characteristics at high temperature and high humidity [%] |
|---|---|---|---|---|---|
|  | Solid-state electrolyte layer ($\varphi_c$) | Side margin layer ($\varphi_m$) | | | |
| Example 2-1B | 0.068 | 0.1 | 1.5 | 0.6 | 66 |
| Example 2-2B | 0.050 | 0.1 | 2.0 | 0.6 | 68 |
| Example 2-3B | 0.033 | 0.1 | 3.0 | 0.6 | 65 |
| Example 2-4B | 0.025 | 0.1 | 4.0 | 0.6 | 60 |
| Comparative Example 2-1B | 0.200 | 0.1 | 0.5 | 0.6 | 42 |
| Comparative Example 2-2B | 0.010 | 0.1 | 10 | 0.6 | 35 |
| Example 2-5B | 0.68 | 1.0 | 1.5 | 0.6 | 75 |
| Example 2-6B | 0.50 | 1.0 | 2.0 | 0.6 | 84 |
| Example 2-7B | 0.33 | 1.0 | 3.0 | 0.6 | 82 |
| Example 2-8B | 0.25 | 1.0 | 4.0 | 0.6 | 72 |
| Comparative Example 2-3B | 2.00 | 1.0 | 0.5 | 0.6 | 49 |
| Comparative Example 2-4B | 0.10 | 1.0 | 10 | 0.6 | 47 |
| Example 2-9B | 6.8 | 10 | 1.5 | 0.6 | 74 |
| Example 2-10B | 5.0 | 10 | 2.0 | 0.6 | 80 |
| Example 2-11B | 3.3 | 10 | 3.0 | 0.6 | 77 |
| Example 2-12B | 2.5 | 10 | 4.0 | 0.6 | 73 |
| Comparative Example 2-5B | 20 | 10 | 0.5 | 0.6 | 40 |
| Comparative Example 2-6B | 1 | 10 | 10 | 0.6 | 48 |
| Example 2-13B | 14 | 20 | 1.5 | 0.6 | 66 |
| Example 2-14B | 10 | 20 | 2.0 | 0.6 | 76 |
| Example 2-15B | 7 | 20 | 3.0 | 0.6 | 73 |
| Example 2-16B | 5 | 20 | 4.0 | 0.6 | 69 |
| Comparative Example 2-7B | 40 | 20 | 0.5 | 0.6 | 30 |
| Comparative Example 2-8B | 2 | 20 | 10 | 0.6 | 45 |
| Example 2-17B | 0.03 | 0.05 | 1.5 | 0.6 | 60 |
| Example 2-18B | 17 | 25 | 1.5 | 0.6 | 65 |
| Example 2-19B | 0.01 | 0.05 | 4 | 0.6 | 63 |
| Example 2-20B | 6.3 | 25 | 4 | 0.6 | 65 |

As shown in Table 6, the cycle characteristics at high temperature and high humidity (a temperature of 40° C. and a humidity of 93%) in Comparative Example 2-1B to Comparative Example 2-8B are less than 50%, whereas the cycle characteristics at high temperature and high humidity (a temperature of 40° C. and a humidity of 93%) in Example 2-1B to Example 2-20B in which the porosities $\varphi_m$ of the side margin layers were within the range of $0.1 \leq \varphi_m \leq 20$ were 60% or more. Particularly, the cycle characteristics at high temperature and high humidity (a temperature of 40° C. and a humidity of 93%) in Example 2-5B to Example 2-12B in which the porosities $\varphi_m$ of the side margin layers were within the range of $1 \leq \varphi_m \leq 10$ were 72% or more.

Example 3-1B to Example 3-4B and Comparative Example 3-1B

In Example 3-1B to Example 3-4B and Comparative Example 3-1B, solid-state secondary batteries were prepared in the same manner as in Example 1-1B except that average circular area conversion diameters were adjusted using average particle sizes of nylon fine particles to be added as a void forming agent of 0.2 μm, 2.0 μm, 0.1 μm, 3.0 μm and 8.0 μm when pastes for a solid-state electrolyte layer and pastes for a side margin layer were prepared.

The amounts of nylon fine particles to be added were shown in Table 7.

Table 8 shows the evaluation results of the solid-state secondary batteries.

TABLE 7

|  | Paste for solid-state electrolyte layer Nylon fine particles (parts) | Paste for side margin Nylon fine particles (parts) | Nylon particle size [μm] |
|---|---|---|---|
| Example 3-1B | 2.5 | 5.0 | 0.2 |
| Example 3-2B | 2.5 | 5.0 | 2.0 |
| Example 3-3B | 2.5 | 5.0 | 0.1 |
| Example 3-4B | 2.5 | 5.0 | 3.0 |
| Comparative Example 3-1B | 2.5 | 5.0 | 8.0 |

TABLE 8

|  | Porosity [%] | | | Average circular area conversion diameter [μm] | Cycle characteristics at high temperature and high humidity [%] |
|---|---|---|---|---|---|
|  | Solid-state electrolyte layer ($\varphi_e$) | Side margin layer ($\varphi_m$) | Porosity ratio ($\varphi_m/\varphi_e$) | | |
| Example 3-1B | 2.5 | 5.0 | 2.0 | 0.1 | 78 |
| Example 3-2B | 2.5 | 5.0 | 2.0 | 1.0 | 83 |
| Example 3-3B | 2.5 | 5.0 | 2.0 | 0.05 | 75 |
| Example 3-4B | 2.5 | 5.0 | 2.0 | 2.0 | 70 |
| Comparative Example 3-1B | 2.5 | 5.0 | 2.0 | 4.0 | 57 |

As shown in Table 8, the cycle characteristics at high temperature and high humidity (a temperature of 40° C. and a humidity of 93%) in Comparative Example 3-1B were less than 60%, whereas the cycle characteristics at high temperature and high humidity (a temperature of 40° C. and a humidity of 93%) also in Example 3-1B to Example 3-4B in which average circular area conversion diameters d were 0.05≤d≤2.00 μm were 70% or more. Particularly, the cycle characteristics at high temperature and high humidity (a temperature of 40° C. and a humidity of 93%) in Example 3-1B and Example 3-2B in which average circular area conversion diameters d were 0.1≤d≤1 μm were 78% or more.

REFERENCE SIGNS LIST

1 Positive electrode layer
1A Positive electrode current collector
1B Positive electrode active material layer
2 Negative electrode layer
2A Negative electrode current collector
2B Negative electrode active material layer
3 Solid-state electrolyte layer
3A Interlayer solid-state electrolyte layer
3B Outermost solid-state electrolyte layer
41 Positive electrode side margin layer
42 Negative electrode side margin layer
6 First external terminal
7 Second external terminal
20 Laminated body
100 Solid-state secondary battery

What is claimed is:

1. A solid-state secondary battery comprising:
a positive electrode layer including a positive electrode current collector layer and a positive electrode active material layer;
a negative electrode layer including a negative electrode current collector layer and a negative electrode active material layer;
a solid-state electrolyte layer including a solid-state electrolyte; and
side margin layers arranged side by side on outer circumferences of the positive electrode layer and the negative electrode layer,
wherein the solid-state secondary battery is made of a laminated body obtained by alternately laminating the positive electrode layer of which the side margin layer arranged on the outer circumference thereof and the negative electrode layer of which the side margin layer arranged on the outer circumference thereof with the solid-state electrolyte layer arranged therebetween, and
when the porosity of the side margin layers is defined as $\varphi_m$ and the porosity of the solid-state electrolyte layer is defined as $\varphi_e$, a porosity ratio ($\varphi_m/\varphi_e$) satisfies the following Expression (1);

$$0.5 \leq (\varphi_m/\varphi_e) < 1.0 \tag{1}$$

2. The solid-state secondary battery according to claim 1, wherein the porosity ratio ($\varphi_m/\varphi_e$) satisfies the following Expression (2);

$$0.6 \leq (\varphi m/\varphi_e) < 1.0 \tag{2}$$

3. The solid-state secondary battery according to claim 1, wherein the porosity $\varphi_e$ of the solid-state electrolyte layer is $1.0\% \leq \varphi_e \leq 25.0\%$.

4. The solid-state secondary battery according to claim 1, wherein an average circular area conversion diameter d of voids included in the solid-state electrolyte layer and the side margin layers is 0.1≤d<2.0 μm;
here, when the total area of n voids in a SEM image is defined as X, the average circular area conversion diameter d is calculated by the following Expression (3);

$$d = \{X/(n \times \pi)\}^{(1/2)} \times 2 \tag{3}$$

5. The solid-state secondary battery according to claim 2, wherein the porosity $\varphi_e$ of the solid-state electrolyte layer is $1.0\% \leq \varphi_e \leq 25.0\%$.

6. The solid-state secondary battery according to claim 2, wherein an average circular area conversion diameter d of voids included in the solid-state electrolyte layer and the side margin layers is 0.1≤d<2.0 μm;
here, when the total area of n voids in a SEM image is defined as X, the average circular area conversion diameter d is calculated by the following Expression (3);

$$d = \{X/(n \times \pi)\}^{(1/2)} \times 2 \tag{3}$$

7. The solid-state secondary battery according to claim 3, wherein an average circular area conversion diameter d of voids included in the solid-state electrolyte layer and the side margin layers is 0.1≤d<2.0 μm;

here, when the total area of n voids in a SEM image is defined as X, the average circular area conversion diameter d is calculated by the following Expression (3);

$$d=\{X/(n\times\pi)\}^{(1/2)}\times 2 \qquad (3).$$

8. The solid-state secondary battery according to claim 5, wherein an average circular area conversion diameter d of voids included in the solid-state electrolyte layer and the side margin layers is 0.1≤d<2.0 μm;

here, when the total area of n voids in a SEM image is defined as X, the average circular area conversion diameter d is calculated by the following Expression (3);

$$d=\{X/(n\times\pi)\}^{(1/2)}\times 2 \qquad (3).$$

9. A solid-state secondary battery comprising:
a positive electrode layer including a positive electrode current collector layer and a positive electrode active material layer;
a negative electrode layer including a negative electrode current collector layer and a negative electrode active material layer;
a solid-state electrolyte layer including a solid-state electrolyte; and
side margin layers arranged side by side on outer circumferences of the positive electrode layer and the negative electrode layer,
wherein the solid-state secondary battery is made of a laminated body formed by alternately laminating the positive electrode layer of which the side margin layer arranged on the outer circumference thereof and the negative electrode layer of which the side margin layer arranged on the outer circumference thereof with the solid-state electrolyte layer arranged therebetween, and
when the porosity of the side margin layers is defined as $\varphi_m$ and the porosity of the solid-state electrolyte layer is defined as $\varphi_e$, a porosity ratio ($\varphi_m/\varphi_e$) satisfies the following Expression (4);

$$1.0\leq(\varphi_m/\varphi_e)\leq 4.0 \qquad (4).$$

10. The solid-state secondary battery according to claim 9, wherein the porosity $\varphi_m$ of the side margin layers is 0.1%≤$\varphi_m$≤20.0%.

11. The solid-state secondary battery according to claim 9, wherein an average circular area conversion diameter d of voids included in the solid-state electrolyte layer and the side margin layers is 0.05≤d≤2.00 μm;

here, when the total area of n voids in a SEM image is defined as X, the average circular area conversion diameter d is calculated by the following Expression (3);

$$d=\{X/(n\times\pi)\}^{(1/2)}\times 2 \qquad (3).$$

12. The solid-state secondary battery according to claim 10, wherein an average circular area conversion diameter d of voids included in the solid-state electrolyte layer and the side margin layers is 0.05≤d≤2.00 μm;

here, when the total area of n voids in a SEM image is defined as X, the average circular area conversion diameter d is calculated by the following Expression (3);

$$d=\{X/(n\times\pi)\}^{(1/2)}\times 2 \qquad (3).$$

* * * * *